US012431730B2

(12) United States Patent
Chou et al.

(10) Patent No.: US 12,431,730 B2
(45) Date of Patent: Sep. 30, 2025

(54) CHARGING METHOD WITH HYSTERESIS AND MOBILE DEVICE THEREOF (71) Applicant: Acer Incorporated, New Taipei (TW)

(72) Inventors: Shuo-Jung Chou, New Taipei (TW); Chuan-Jung Wang, New Taipei (TW); Chih-Chiang Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 853 days.

(21) Appl. No.: 17/699,934

(22) Filed: Mar. 21, 2022

(65) Prior Publication Data

US 2023/0179009 A1    Jun. 8, 2023

(30) Foreign Application Priority Data

Dec. 3, 2021  (TW) .................. 110145180

(51) Int. Cl.
*H02J 7/00* (2006.01)
*H01M 10/44* (2006.01)
(Continued)

(52) U.S. Cl.
CPC ..... *H02J 7/007194* (2020.01); *H01M 10/443* (2013.01); *H01M 10/46* (2013.01);
(Continued)

(58) Field of Classification Search
CPC ......... H02J 7/007194; H02J 7/007182; H01M 10/443; H01M 10/46; H01M 10/486
(Continued)

(56) References Cited

U.S. PATENT DOCUMENTS 9,748,788 B2 * 8/2017 Sporck ................. H02J 7/04
10,491,006 B2  11/2019 Wu et al.
(Continued)

FOREIGN PATENT DOCUMENTS

CN   103312010 A   9/2013
TW   200503379 A   1/2005
TW   201917982 A   5/2019

OTHER PUBLICATIONS

Chinese language office action dated Aug. 16, 2022, issued in application No. TW 110145180.

*Primary Examiner* — Nathaniel R Pelton
(74) *Attorney, Agent, or Firm* — McClure, Qualey & Rodack, LLP (57) ABSTRACT A charging method with hysteresis includes the steps of: performing a pre-determination process to check whether the battery temperature of a battery cell is higher than or equal to a predetermined temperature; if the battery temperature is higher than or equal to the predetermined temperature, enabling a hysteresis mechanism; Upon the hysteresis mechanism, initially charging the battery cell with a small charging current; performing a first determination process to check whether the battery temperature decreases to a first threshold temperature; if the battery temperature decreases to the first threshold temperature, charging the battery cell with a large charging current; performing a second determination process to check whether the battery temperature increases to a second threshold temperature; and if the battery temperature increases to the second threshold temperature, charging the battery cell with the small charging current.

12 Claims, 7 Drawing Sheets (51) Int. Cl.
*H01M 10/46* (2006.01)
*H01M 10/48* (2006.01)

(52) U.S. Cl.
CPC ..... *H01M 10/486* (2013.01); *H02J 7/007182* (2020.01); *H01M 2220/30* (2013.01)

(58) Field of Classification Search
USPC .......................................................... 320/153
See application file for complete search history.

(56) References Cited

U.S. PATENT DOCUMENTS

| | | |
|---|---|---|
| 2009/0298335 A1 | 12/2009 | Rotta et al. |
| 2017/0293335 A1* | 10/2017 | Dunstan .............. G06F 13/4022 |
| 2018/0198296 A1* | 7/2018 | He ...................... H02J 7/00309 |
| 2019/0097432 A1* | 3/2019 | Du ........................ H02J 7/0071 |
| 2019/0115764 A1* | 4/2019 | Wu ..................... H02J 7/00041 |
| 2020/0266647 A1* | 8/2020 | Ramachandran ..... H01M 10/48 |

* cited by examiner

CHARGING METHOD WITH HYSTERESIS AND MOBILE DEVICE THEREOF

CROSS REFERENCE TO RELATED APPLICATIONS

This Application claims priority of Taiwan Patent Application No. 110145180 filed on Dec. 3, 2021, the entirety of which is incorporated by reference herein.

BACKGROUND OF THE INVENTION

Field of the Invention

The disclosure generally relates to a charging method, and more specifically, to a charging method with hysteresis.

Description of the Related Art

Notebook computers and tablet computers usually require battery components. However, because of the high-temperature charging protection mechanisms they employ, the process for charging conventional battery modules may be forcibly interrupted before the aforementioned charging process is fully completed. This may lead to insufficient battery life. Accordingly, there is a need to propose a novel solution for solving the problems of the prior art.

BRIEF SUMMARY OF THE INVENTION

In an exemplary embodiment, the invention is directed to a charging method with hysteresis. The charging method includes the steps of: performing a pre-determination process to check whether the battery temperature of a battery cell is higher than or equal to a predetermined temperature; if the battery temperature is higher than or equal to the predetermined temperature, enabling a hysteresis mechanism; Upon the hysteresis mechanism, initially charging the battery cell with a small charging current; performing a first determination process to check whether the battery temperature decreases to a first threshold temperature; if the battery temperature decreases to the first threshold temperature, charging the battery cell with a large charging current; performing a second determination process to check whether the battery temperature increases to a second threshold temperature; and if the battery temperature increases to the second threshold temperature, charging the battery cell with the small charging current.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are described in detail below.

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". The term "substantially" means the value is within an acceptable error range. One skilled in the art can solve the technical problem within a predetermined error range and achieve the proposed technical performance. Also, the term "couple" is intended to mean either an indirect or direct electrical connection. Accordingly, if one device is coupled to another device, that connection may be through a direct electrical connection, or through an indirect electrical connection via other devices and connections.

Figure 1:
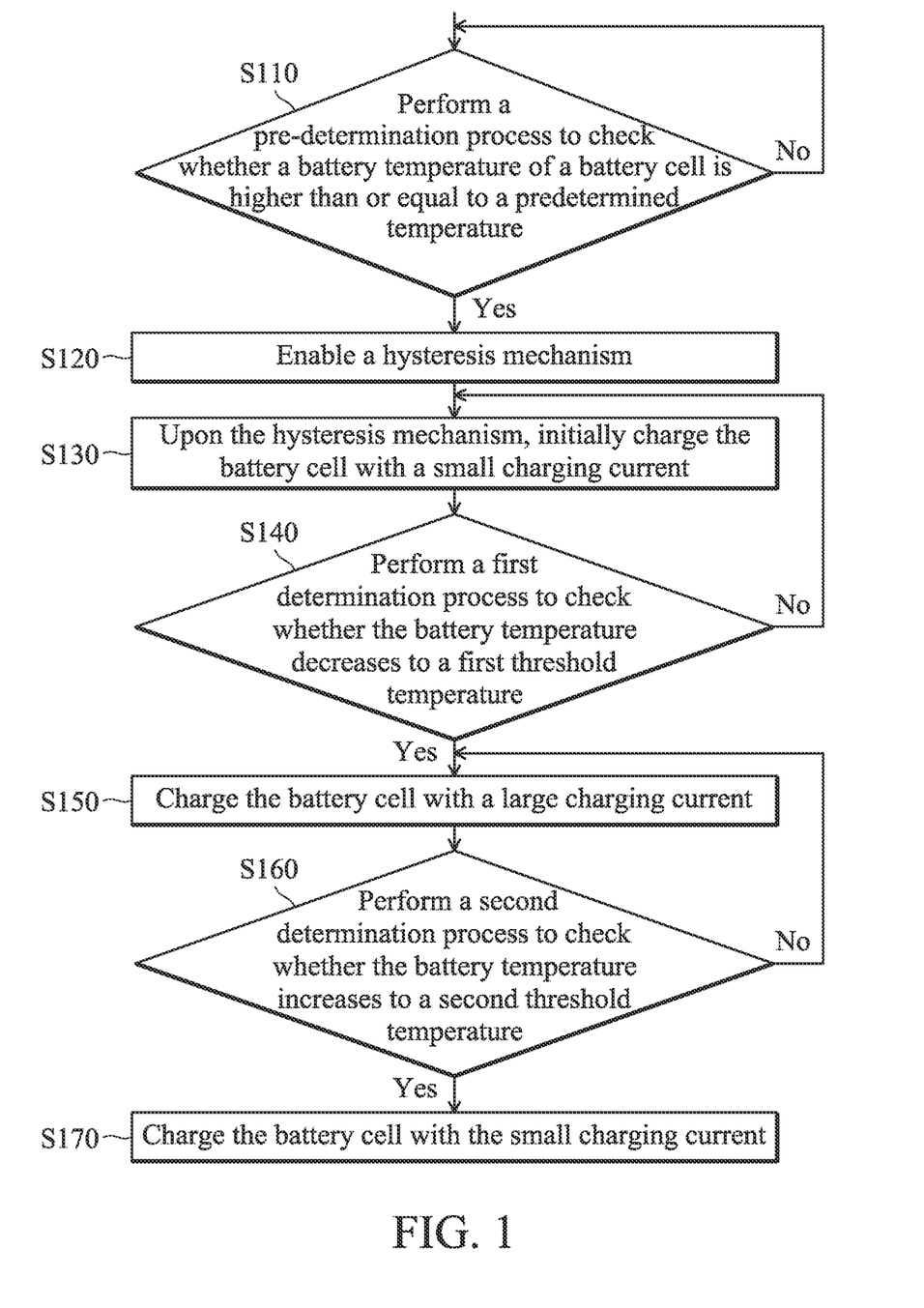
FIG. 1 is a flowchart of a charging method with hysteresis according to an embodiment of the invention.

FIG. 1 is a flowchart of a charging method with hysteresis according to an embodiment of the invention. The charging method of FIG. 1 includes the following steps. In the step S110, a pre-determination process is performed to check whether the battery temperature of a battery cell is higher than or equal to a predetermined temperature. If not, the procedure will go back to the step S110. If so, in the step S120, a hysteresis mechanism is enabled. In the step S130, upon the hysteresis mechanism, the battery cell is initially charged with a small charging current. Because the small charging current is applied, the battery temperature of the battery cell may gradually decrease. In the step S140, a first determination process is performed to check whether the battery temperature decreases to a first threshold temperature. If not, the procedure will go back to the step S130. If so, in the step S150, the battery cell is charged with a large charging current. Because the large charging current is applied, the battery temperature of the battery cell may gradually increase. In the step S160, a second determination process is performed to check whether the battery temperature increases to a second threshold temperature. If not, the procedure will go back to the step S150. If so, in the step S170, the battery cell is charged with the small charging current again.

Figure 2:
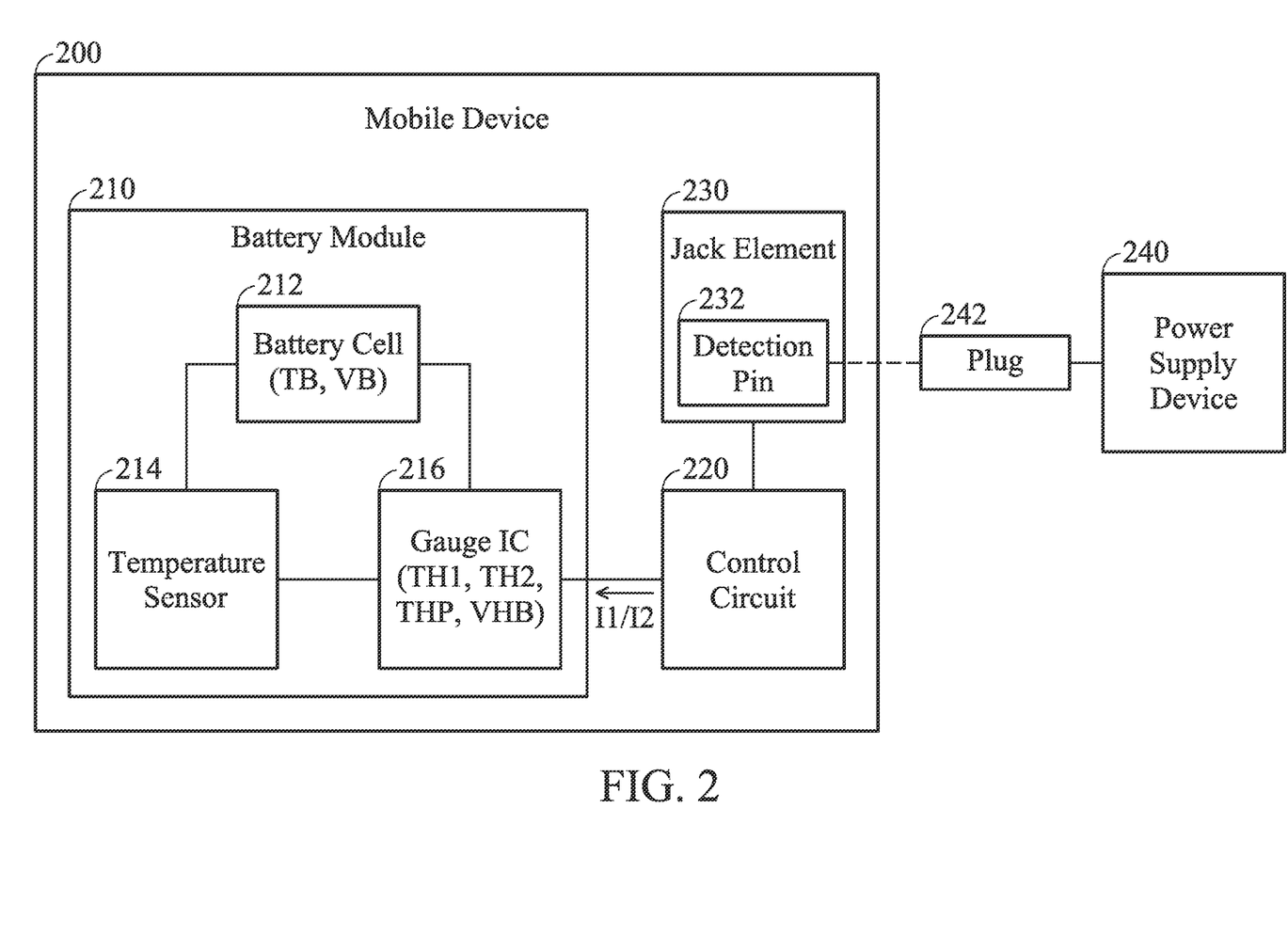
FIG. 2 is a diagram of a mobile device with hysteresis according to an embodiment of the invention.

FIG. 2 is a diagram of a mobile device 200 with hysteresis according to an embodiment of the invention. The mobile device 200 is configured to operate the aforementioned charging method. For example, the mobile device 200 may be a notebook computer. In the embodiment of FIG. 2, the mobile device 200 at least includes a battery module 210 and a control circuit 220. The battery module 210 includes a battery cell 212, a temperature sensor 214, and a gauge IC (Integrated Circuit) 216. In addition, the control circuit 220 may include an EC (Embedded Controller) and a charger IC (not shown).

The battery cell 212, the temperature sensor 214, and the gauge IC 216 are coupled to each other. The temperature sensor 214 detects a battery temperature TB of the battery cell 212. The gauge IC 216 receives the information relative to the battery temperature TB, and performs a pre-determination process. If the battery temperature TB is higher than or equal to a predetermined temperature THP, the gauge IC 216 will enable a hysteresis mechanism and communicate with the control circuit 220, such that the control circuit 220 can perform a hysteresis charging operation to the battery cell 212.

Upon the hysteresis mechanism, the control circuit 220 initially charges the battery cell 212 with a small charging current I1. At this time, because the small charging current I1 is applied, the battery temperature TB of the battery cell 212 may gradually decrease. The temperature sensor 214 continuously monitors the battery temperature TB and notifies the gauge IC 216. The gauge IC 216 performs a first determination process, and compares the battery temperature TB with a first threshold temperature TH1. If the battery temperature TB decreases to the first threshold temperature TH1, the gauge IC 216 will notify the control circuit 220, such that the control circuit 220 can charge the battery cell 212 with a large charging current I2. At this time, because the large charging current I2 is applied, the battery temperature TB of the battery cell 212 may gradually increase. The gauge IC 216 performs a second determination process, and compares the battery temperature TB with a second threshold temperature TH2. If the battery temperature TB increases to the second threshold temperature TH2, the gauge IC 216 will notify the control circuit 220, such that the control circuit 220 can charge the battery cell 212 with the small charging current I1 again. In some embodiments, the first determination process and the second determination process are alternately performed one or more times by the gauge IC 216. It should be understood that the first determination process and the second determination process are the main operation steps of the proposed hysteresis mechanism.

In some embodiments, the predetermined temperature THP is higher than the second threshold temperature TH2, and the second threshold temperature TH2 is higher than the first threshold temperature TH1. For example, the predetermined temperature THP may be equal to 45° C., the second threshold temperature TH2 may be equal to 44° C., and the first threshold temperature TH1 may be equal to 42° C., but they are not limited thereto.

In some embodiments, the large charging current I2 may be substantially twice the small charging current I1. For example, the large charging current I2 may be equal to 5675 mA, and the small charging current I1 may be equal to 2837 mA, but they are not limited thereto.

In some embodiments, the mobile device 200 further includes a jack element 230, and the jack element 230 includes a detection pin 232. The mobile device 200 is selectively coupled to a power supply device 240. When the mobile device 200 is coupled to the power supply device 240, the power supply device 240 can provide stable electric power from an AC (Alternating Current) power source (not shown) to the mobile device 200, such that the control circuit 220 can charge the battery cell 212. Conversely, when the mobile device 200 is decoupled from the power supply device 240, the control circuit 220 cannot charge the battery cell 212. The power supply device 240 has a plug 242, but they are not any portion of the mobile device 200.

Figure 3:
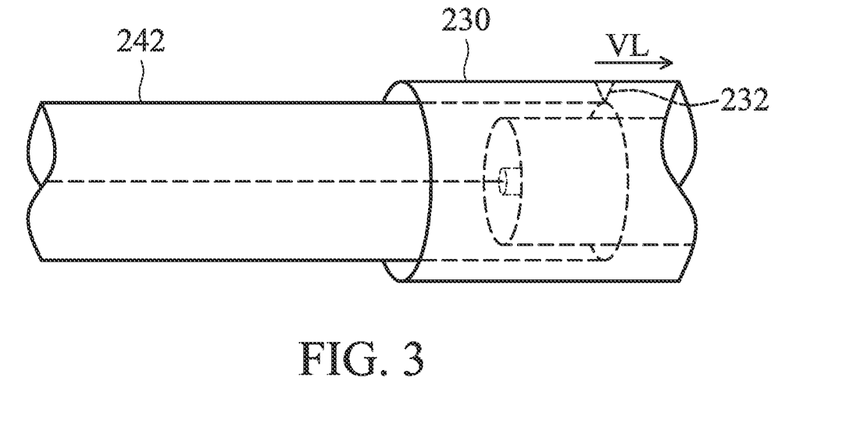
FIG. 3 is a diagram of a mobile device coupled to a power supply device according to an embodiment of the invention.

FIG. 3 is a diagram of the mobile device 200 coupled to the power supply device 240 according to an embodiment of the invention. In the embodiment of FIG. 3, the plug 242 of the power supply device 240 is inserted in the jack element 230 of the mobile device 200. At this time, the plug 242 of the power supply device 240 touches the detection pin 232 of the jack element 230, such that the detection pin 232 generates a low logic voltage VL.

Figure 4:
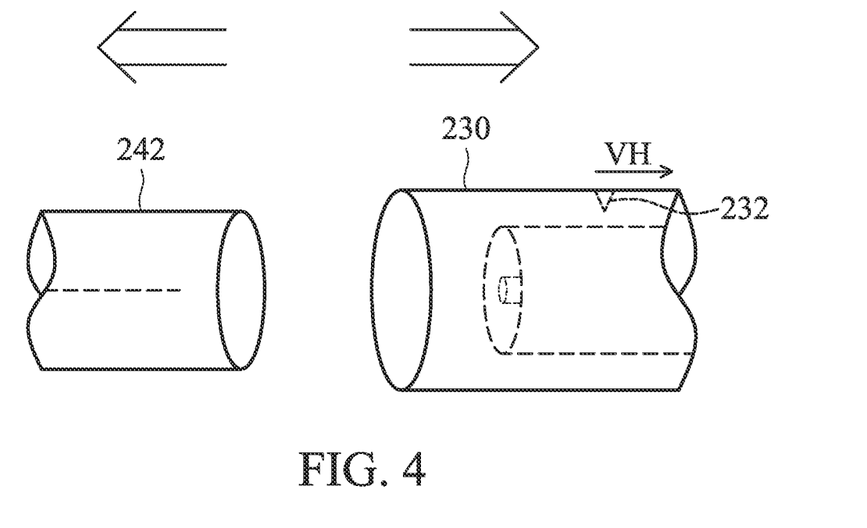
FIG. 4 is a diagram of a mobile device decoupled from a power supply device according to an embodiment of the invention.

FIG. 4 is a diagram of the mobile device 200 decoupled from the power supply device 240 according to an embodiment of the invention. In the embodiment of FIG. 4, the plug 242 of the power supply device 240 is unplugged from the jack element 230 of the mobile device 200. At this time, the plug 242 of the power supply device 240 does not touch the detection pin 232 of the jack element 230, such that the detection pin 232 generates a high logic voltage VH.

The control circuit 220 is coupled to the jack element 230 and its detection pin 232. By analyzing the voltage at the detection pin 232, the control circuit 220 can easily check whether the plug 242 of the power supply device 240 is inserted in the jack element 230 of the mobile device 200.

Figure 5A:
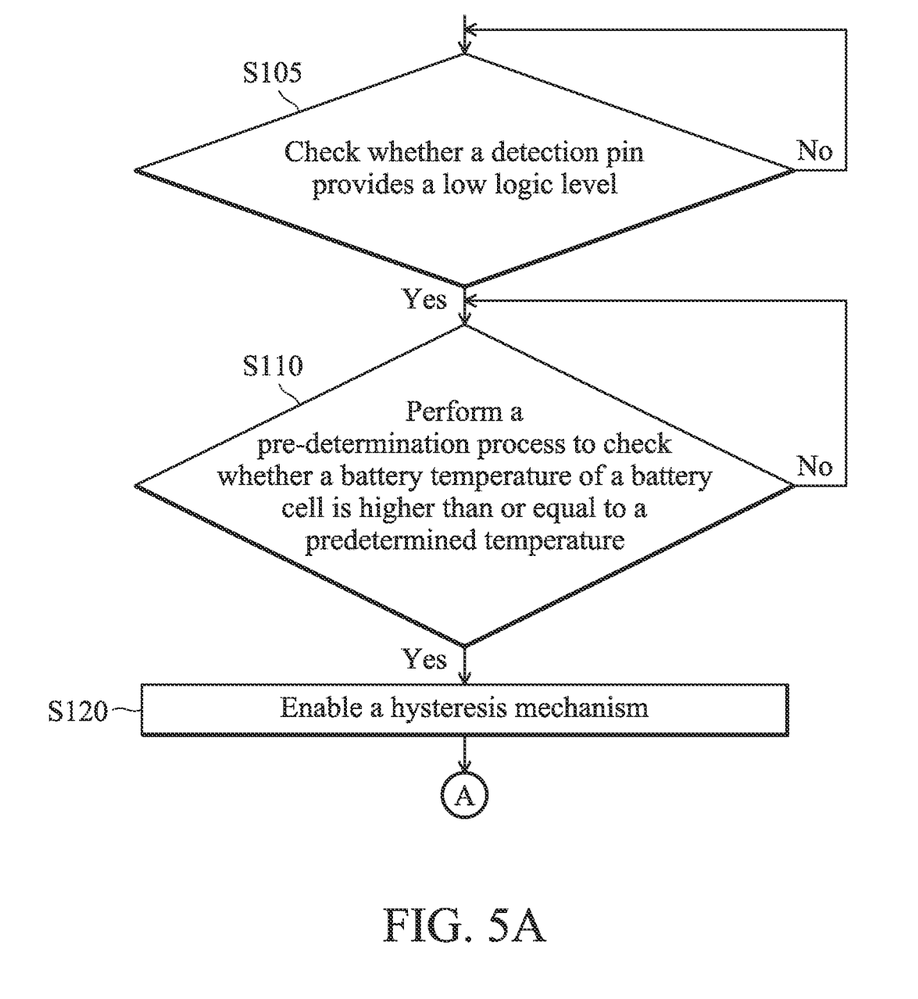
FIG. 5A and FIG. 5B are a flowchart of a charging method with hysteresis according to an embodiment of the invention.
Figure 5B:
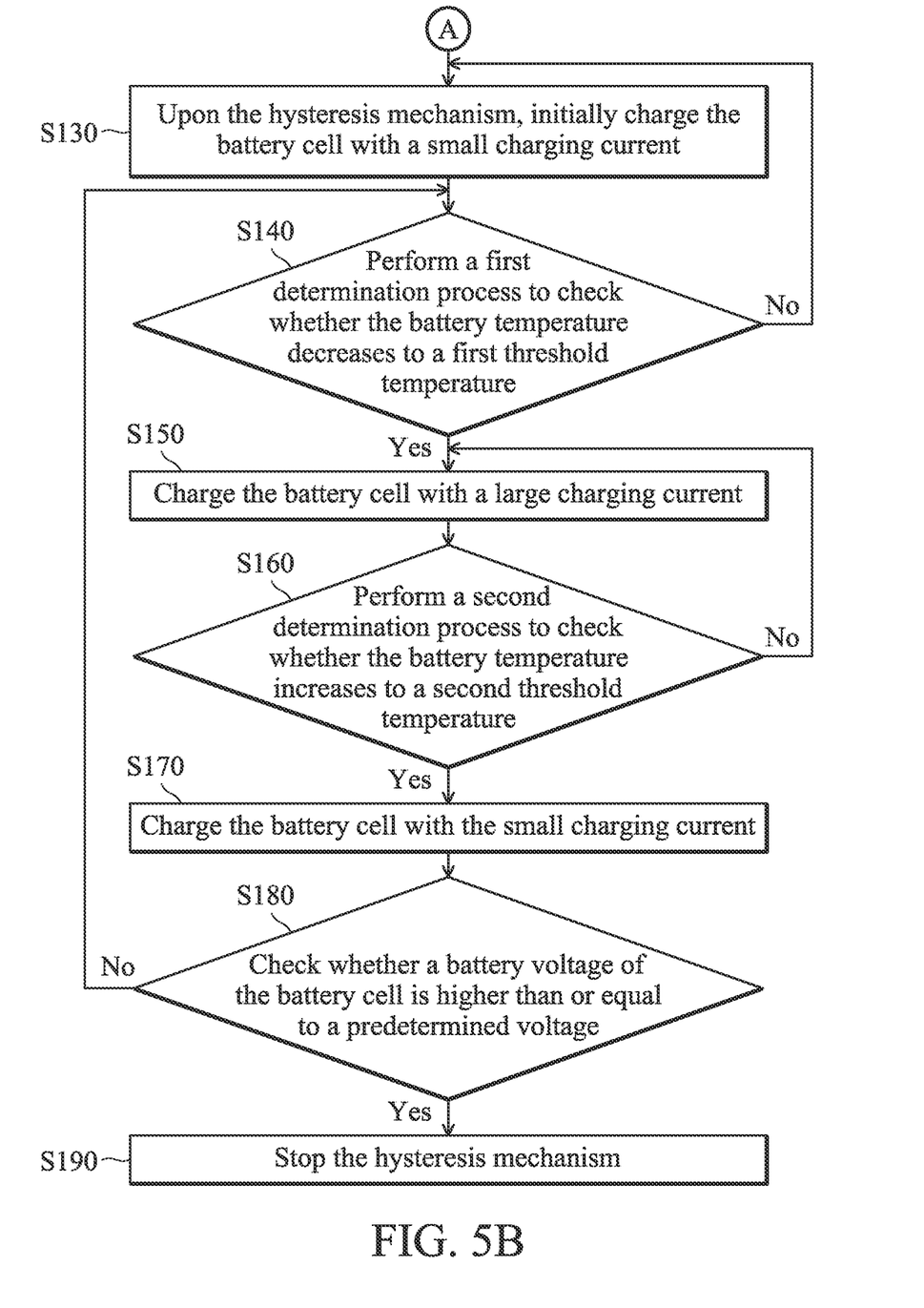

FIG. 5A and FIG. 5B are a flowchart of a charging method with hysteresis according to an embodiment of the invention. FIG. 5A and FIG. 5B are similar to FIG. 1. Please refer to FIG. 2, FIG. 5A, and FIG. 5B. The charging method of FIG. 5A and FIG. 5B includes the following steps. In the step S105, whether a detection pin 232 provides a low logic level VL is checked. If not, the procedure will go back to the step S105. If so, in the step S110, a pre-determination process is performed to check whether the battery temperature TB of a battery cell 212 is higher than or equal to a predetermined temperature THP (i.e., the pre-determination process is performed only after the detection pin 232 provides the low logic level VL). If not, the procedure will go back to the step S110. If so, in the step S120, a hysteresis mechanism is enabled. In the step S130, upon the hysteresis mechanism, the battery cell 212 is initially charged with a small charging current I1. In the step S140, a first determination process is performed to check whether the battery temperature TB decreases to a first threshold temperature TH1. If not, the procedure will go back to the step S130. If so, in the step S150, the battery cell 212 is charged with a large charging current I2. In the step S160, a second determination process is performed to check whether the battery temperature TB increases to a second threshold temperature TH2. If not, the procedure will go back to the step S150. If so, in the step S170, the battery cell 212 is charged with the small charging current I1 again. In step S180, a gauge IC 216 is used to check whether a battery voltage VB of the battery cell 212 is higher than or equal to a predetermined voltage VHB. For example, the gauge IC 216 may detect the battery voltage VB of the battery cell 212, and may compare the battery voltage VB with the predetermined voltage VHB. If not, the procedure will go back to the step S140. If so, in the step S190, the hysteresis mechanism is stopped by the gauge IC 216. For example, the predetermined voltage VHB may be equal to 4.1V, but it is not limited thereto.

Figure 6:
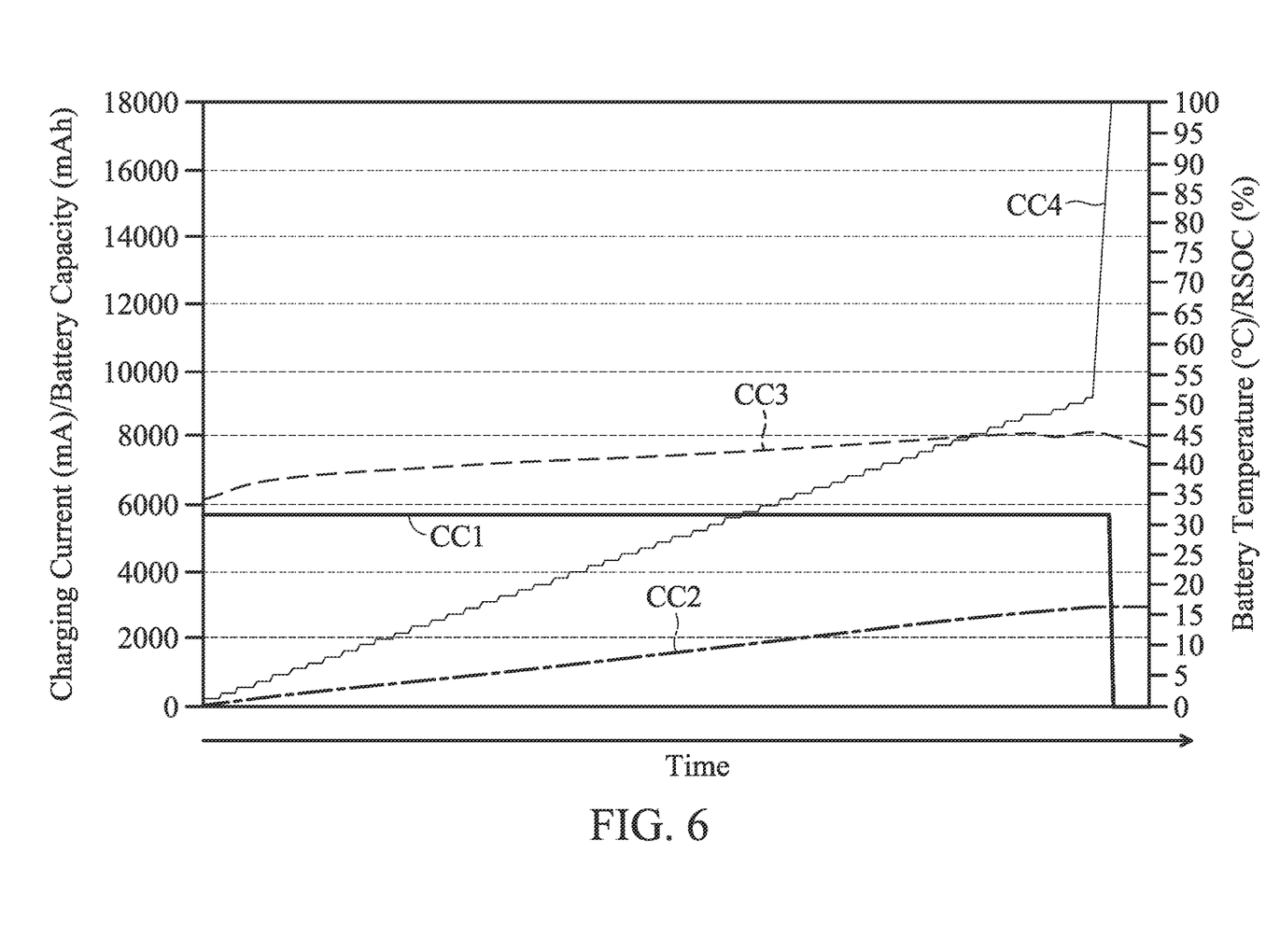
FIG. 6 is a diagram of parameter waveforms of a conventional mobile device during a charging process.

FIG. 6 is a diagram of parameter waveforms of a conventional mobile device during a charging process. The horizontal axis represents the time. The left-side vertical axis represents the charging current (mA)/the battery capacity (mAh). The right-side vertical axis represents the battery temperature (° C.)/the RSOC (Relative State of Charge) (%). Specifically, a first curve CC1 represents the charging current of the battery cell (corresponding to the left-side vertical axis, "mA"), a second curve CC2 represents the battery capacity of the battery cell (corresponding to the left-side vertical axis, "mAh"), a third curve CC3 represents the battery temperature of the battery cell (corresponding to the right-side vertical axis, "° C"), and a fourth curve CC4 represents the RSOC of the battery cell (corresponding to the right-side vertical axis, "%"). According to the measurement of FIG. 6, if the battery temperature reaches 45° C. and the voltage of the battery cell reaches 4.1V, a high-temperature charging protection mechanism will be triggered. Thus, the RSOC of the battery cell will suddenly jump to 100%, thereby terminating the whole charging process. However, at this time, the battery capacity may merely reach a half of its maximum value, such as 2943 mAh. Therefore, in a conventional mobile device, the battery module may not provide too long a battery life even if the RSOC of the battery cell is shown as 100%.

Figure 7:
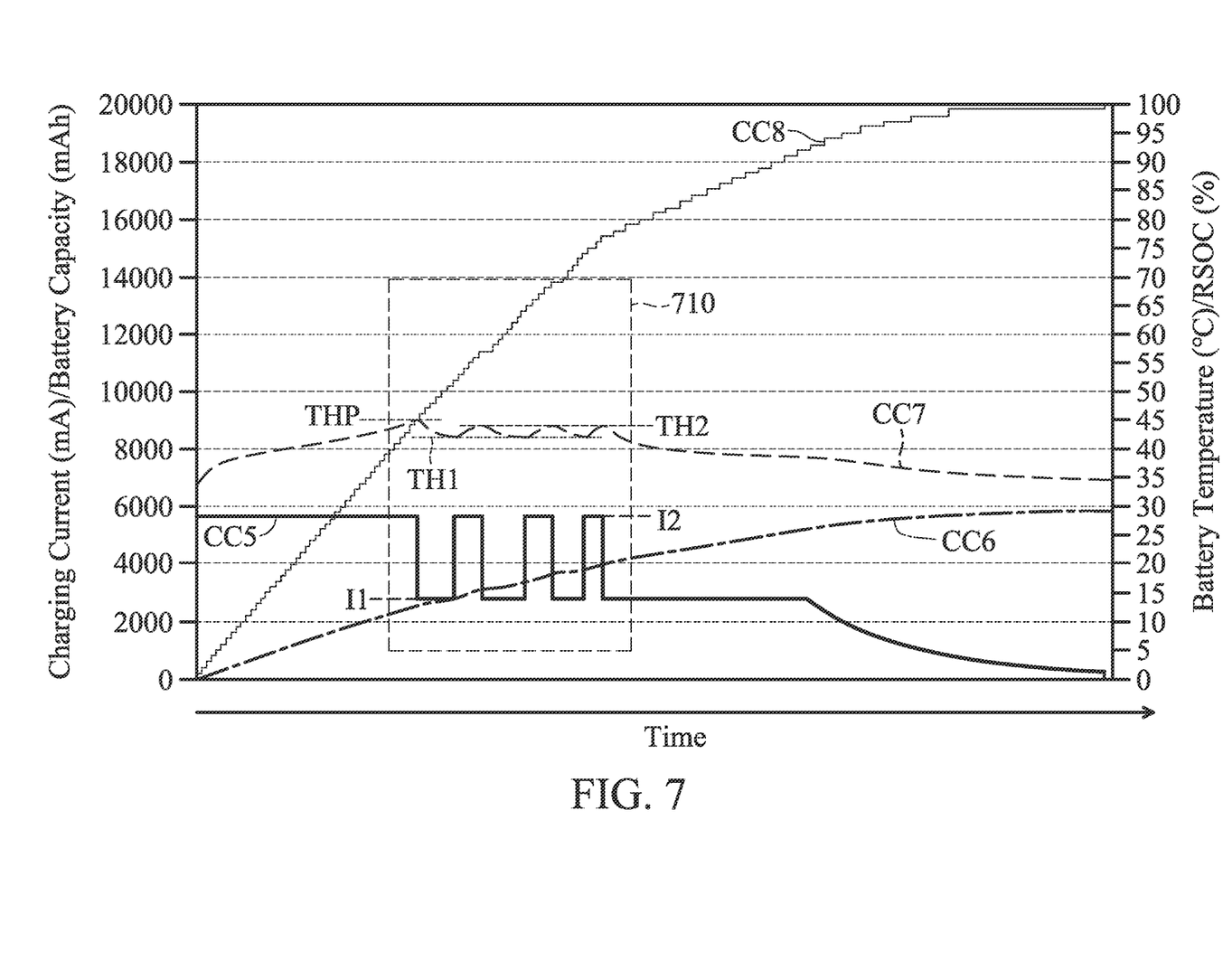
FIG. 7 is a diagram of parameter waveforms of a mobile device with hysteresis during a charging process according to an embodiment of the invention.

FIG. 7 is a diagram of parameter waveforms of the mobile device 200 with hysteresis during a charging process according to an embodiment of the invention. The horizontal axis represents the time. The left-side vertical axis represents the charging current (mA)/the battery capacity (mAh). The right-side vertical axis represents the battery temperature (° C.)/the RSOC (%). Specifically, a fifth curve CC5 represents the charging current of the battery cell 212 (corresponding to the left-side vertical axis, "mA"), a sixth curve CC6 represents the battery capacity of the battery cell 212 (corresponding to the left-side vertical axis, "mAh"), a seventh curve CC7 represents the battery temperature TB of the battery cell 212 (corresponding to the right-side vertical axis, "° C"), and an eighth curve CC8 represents the RSOC of the battery cell 212 (corresponding to the right-side vertical axis, "%"). According to the measurement of FIG. 7, the mobile device 200 of the invention can enable a hysteresis mechanism (as indicated by a rectangular dashed box 710) when the battery temperature TB rises up to the predetermined temperature THP for the first time. During the enabled hysteresis mechanism, the battery temperature TB may fluctuate between the first threshold temperature TH1 and the second threshold temperature TH2, and the battery cell 212 can be alternately charged with the small charging current I1 and the large charging current I2. It should be noted that since the battery temperature TB does not reach the predetermined temperature THP again, the charging process of the battery cell 212 is not forcibly interrupted. Finally, when the RSOC of the battery cell 212 gradually rise up to 100%, the corresponding battery capacity is much higher than that of the conventional design, such as 5842 mAh. Therefore, with the hysteresis charging design of the invention, the battery module 210 of the mobile device 200 can provide a very sufficient battery life.

The invention proposes a novel charging method and a novel mobile device. In comparison to the conventional design, the invention has at least the advantages of increasing the effective charging time and enhancing the battery life, and therefore it is suitable for application in a variety of devices.

The method of the invention, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

It will be apparent to those skilled in the art that various modifications and variations can be made in the invention. It is intended that the standard and examples be considered exemplary only, with the true scope of the disclosed embodiments being indicated by the following claims and their equivalents.

What is claimed is:

1. A charging method with hysteresis, comprising the steps of:
   performing a pre-determination process to check whether a battery temperature of a battery cell is higher than or equal to a predetermined temperature;
   if the battery temperature is higher than or equal to the predetermined temperature, enabling a hysteresis mechanism;
   upon the hysteresis mechanism, initially charging the battery cell with a small charging current;
   performing a first determination process to check whether the battery temperature decreases to a first threshold temperature;
   if the battery temperature decreases to the first threshold temperature, charging the battery cell with a large charging current;
   performing a second determination process to check whether the battery temperature increases to a second threshold temperature; and
   if the battery temperature increases to the second threshold temperature, charging the battery cell with the small charging current;
   wherein the predetermined temperature is higher than the second threshold temperature, and the second threshold temperature is higher than the first threshold temperature;
   wherein the predetermined temperature is equal to 45° C.

2. The charging method as claimed in claim 1, wherein the first threshold temperature is equal to 42° C.

3. The charging method as claimed in claim 1, wherein the second threshold temperature is equal to 44° C.

4. The charging method as claimed in claim 1, wherein the first determination process and the second determination process are alternately performed one or more times.

5. The charging method as claimed in claim 1, wherein the large charging current is substantially twice the small charging current.

6. The charging method as claimed in claim 1, further comprising:
   checking whether a detection pin provides a low logic level.

7. The charging method as claimed in claim 6, wherein the pre-determination process is performed only after the detection pin provides the low logic level.

8. The charging method as claimed in claim 6, wherein if a plug of a power supply device is inserted into a jack element of a mobile device, the detection pin provides the low logic level.

9. The charging method as claimed in claim 8, wherein if the plug of the power supply device is not inserted into the jack element of the mobile device, the detection pin provides a high logic level.

10. The charging method as claimed in claim 1, further comprising:
    checking whether a battery voltage of the battery cell is higher than or equal to a predetermined voltage; and if the battery voltage is higher than or equal to the predetermined voltage, stopping the hysteresis mechanism.

11. A mobile device with hysteresis, comprising:

a battery module, comprising a battery cell, a temperature sensor, and a gauge IC (Integrated Circuit); and a control circuit;

wherein the temperature sensor detects a battery temperature of the battery cell, and if the battery temperature is higher than or equal to a predetermined temperature, the gauge IC enables a hysteresis mechanism and communicates with the control circuit;

wherein upon the hysteresis mechanism, the control circuit initially charges the battery cell with a small charging current;

wherein if the battery temperature decreases to a first threshold temperature, the control circuit charges the battery cell with a large charging current;

wherein if the battery temperature increases to a second threshold temperature, the control circuit charges the battery cell with the small charging current;

wherein the predetermined temperature is higher than the second threshold temperature, and the second threshold temperature is higher than the first threshold temperature;

wherein the predetermined temperature is equal to 45° C.

12. The mobile device as claimed in claim 11, wherein the large charging current is substantially twice the small charging current.

* * * * *